Patented Jan. 26, 1943

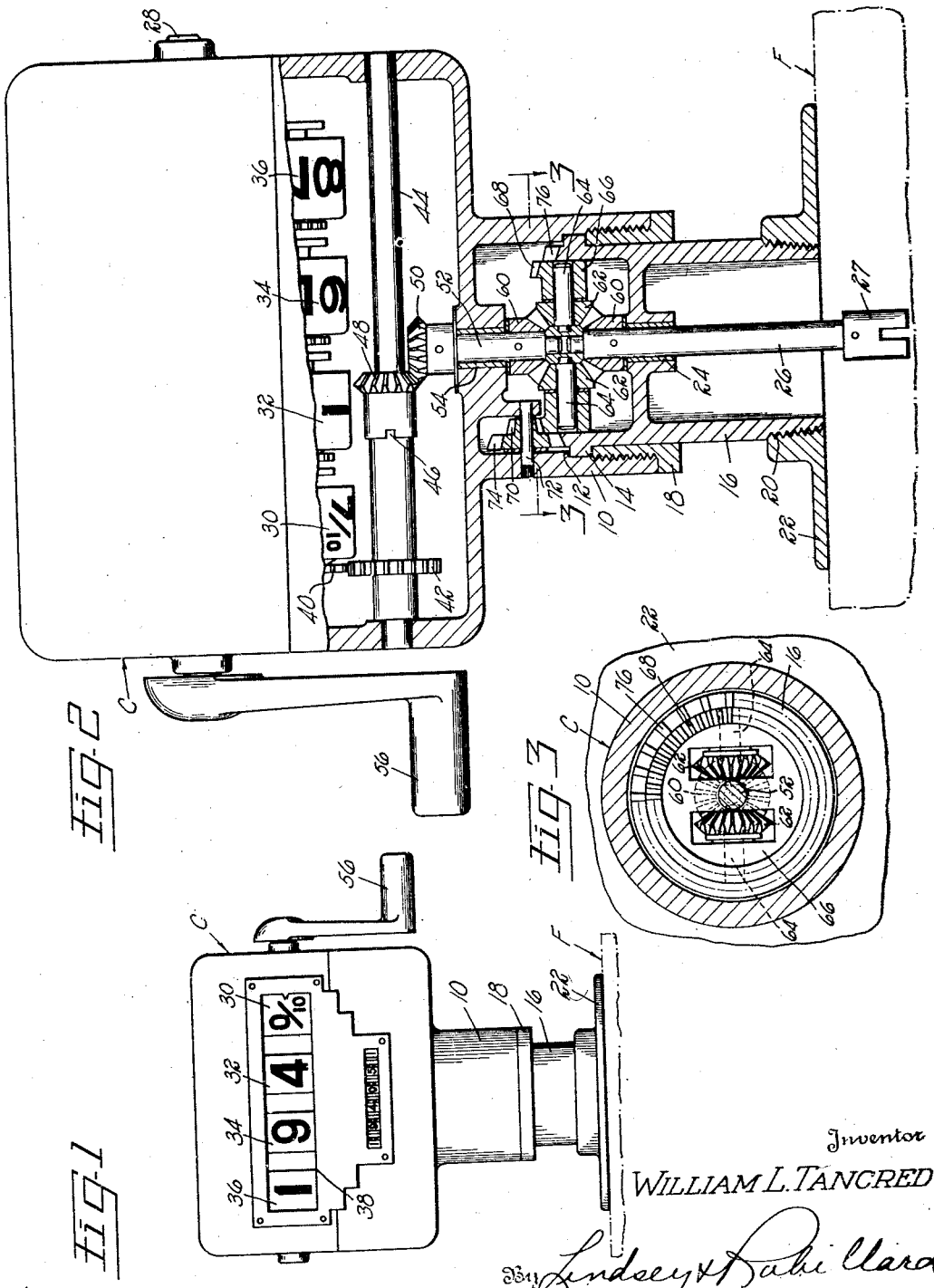

2,309,332

UNITED STATES PATENT OFFICE 2,309,332

REGISTER DRIVE MECHANISM

William L. Tancred, Hartford, Conn., assignor to Veeder-Root Incorporated, Hartford, Conn., a corporation of Connecticut Application October 8, 1940, Serial No. 360,235

6 Claims. (Cl. 235—1)

The present invention relates generally to those types of meters which include a counter operably connected to a rotating shaft in a manner such that the counter accurately indicates the number of revolutions made by the shaft relative to its bearing in the meter frame, and more particularly to an improved counter of this type including a counter casing which can be swivelly adjusted relative to the shaft bearing.

According to the present invention the connection between the counting mechanism and the meter shaft is made in such a manner that swivel movement of the counter casing relative to the shaft bearing does not affect the registration of the counting mechanism, and the counter dial or other indicating means always accurately indicates the number of revolutions made by the meter or drive shaft relative to the meter frame. In the embodiment of the invention illustrated, the connection between the meter shaft and the counter mechanism comprises an epicyclic gear train which includes the meter frame and the counter casing.

Swivel mounted counters are particularly advantageous in combination with tank trucks from which fuel oil deliveries are made. In making a delivery the operator swivelly adjusts the counter so that he can read the indicator from his position at the hand operated valve in the hose nozzle and thereby control the oil delivery to the required quantity.

It is therefore, an object of the present invention to provide a counter which always accurately indicates the output of the meter and which can be swivelly adjusted either preceding, during, or following a counting operation, without requiring resetting of the counter mechanism relative to the meter shaft for each position of adjustment of the counter casing.

A still further object is to provide a swivel mounted counter of this type which does not require locking means to secure the counter casing in the particular position of adjustment and which is of such construction that the casing does not tend to rotate from an adjusted position as the counter wheels are advanced by the meter shaft.

A still further object is to provide a counter of this type which is simple to operate and which may be inexpensively and easily manufactured.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Referring to the drawing:

Figure 1 is a front elevation of a counter rotatably mounted for swivel movement in accordance with the present invention;

Fig. 2 is an enlarged rear elevation of the counter shown in Figure 1 with a portion of the casing broken away to show the epicyclic gear train connecting the meter and counter shafts, and with the "total output" indicator removed to more clearly show the connection between the counter shaft and the numeral wheels; and Fig. 3 is a cross-sectional view taken along line 3—3 of Fig. 2.

Referring to the drawing there is illustrated a counter for visually indicating the number of revolutions made by a meter or drive shaft 26 relative to the meter frame or support F and including a casing C swivelly mounted relative to the meter frame F. In order to swivelly mount the counter, the casing C is provided with a vertically depending cylindrical sleeve 10 having an internal annular shoulder 12 which is rotatably secured on the upwardly disposed external annular ring 14 of a concentric supporting tube 16 by a nut 18. The lower end of the tube 16 is secured by threads 20 to a base 22 which may be a part of or be fixed relative to the meter frame F. The tube 16 is further provided with a concentric bearing 24 which journals the upper end of shaft 26 whose rotations relative to the frame F are to be counted by the counting mechanism in the swivelly mounted counter casing C. In the embodiment illustrated the drive shaft 26 may be driven by a fluid meter (not shown) through the coupling 27 provided on the lower end of the shaft so that the number of revolutions of the shaft will indicate the output of the meter.

Referring to the counting mechanism, there is rotatably journalled in the casing C a shaft 28 which rotatably carries a plurality of counter wheels 30, 32, 34 and 36 of successively higher orders. As is customary in counters of this type the adjacent counter wheels operably engage one another so that every complete revolution of a wheel of lower order advances the wheel of next higher order one-tenth of a revolution. In the illustrated embodiment the counting mechanism is designed for use with liquid meter pumps for dispensing gasoline and the periphery of each wheel is numbered so as to indicate the volume output of the meter in gallons. The wheel 30 of lowest order indicates tenths of gallons and wheels 32, 34, and 36 respectively indicate units, tens, and hundreds of gallons dispensed. When viewed through the opening 38 in the counter casing the registration of the wheels represents the gallons of liquid that have passed through the liquid meter (not shown) as indicated by the number of revolutions of the meter shaft 26. It will be understood however, that the counter wheels may be marked in a variety of ways and may indicate in various units the material being measured by the meter.

The lowest order counter wheel 30 and the counter wheels 32, 34 and 36 of successively higher orders are advanced by a spur gear 40 secured to the wheel 30 and driven by a second spur gear 42 rotatably journalled on an idler shaft 44. The gear 42 is driven through a clutch connection 46 by a bevel gear 48 which is also rotatably supported on shaft 44. Gear 48 is in turn driven by a like bevel gear 50 secured to the upper end of a counter or driven shaft 52 rotatably journalled concentrically with the sleeve 10 in a bearing 54 formed in the counter-casing C. Suitable means including the handle 56 are provided for disengaging the clutch 46 and resetting the counter wheels to zero without rotating the driven shaft 52.

According to the present invention, swivel movement of the casing C does not affect the registration of the counter wheels and the registration always accurately indicates the number of revolutions made by the meter shaft 26 relative to the frame F regardless of the position of adjustment of the counter casing C. In the present embodiment of the invention this is accomplished by operably connecting the shafts 26 and 52 through an epicyclic gear train which includes the casing sleeve 10 and the supporting tube 16. More specificaly the gear train comprises a pair of like sun or bevel gears 60 secured on the adjacent ends of the meter shaft 26 and the counter shaft 52. Gears 60 mesh with a pair of like bevel or planet gears 62 rotatably mounted on aligned pins 64 journalled at right angles to shafts 26 and 52 in a carrier or spider 66. Formed in the upper surface of the spider is a face gear or circular rack 68 meshing with an idler gear 70 carried on an idler shaft 72. Secured to gear 70 on the shaft 72 is a second idler gear 74 meshing with a circular rack 76 formed on the end of the supporting tube 16. As previously indicated swivel movement of the casing relative to the support does not affect the registration of the counter, and accordingly, the face gear 68 is provided with 60 teeth; the idler gears 70 and 74 are each provided with 10 teeth; and the gear 76 is provided with 30 teeth. Thus the epicyclic gear train has a train value of one-half and as a result when the casing is rotated, the driven shaft 52 rotates an equal amount in the same direction. Since no movement of the driven shaft relative to the casing is effected by swivel adjustment of the casing, the counter wheels are not advanced except as they are advanced by rotation of the meter shaft 26 relative to the meter frame F.

In operation, assuming that a delivery operation is being effected and that the counter casing is stationary relative to the supporting tube 16, the idler gears 70 and 74 prevent rotation of the spider 66 and the meter shaft 26 drives the driven shaft 52 for the counter wheels through the like beveled gears 60 and the connecting beveled gears 62 so that the shaft 52 makes the same number of revolutions as the shaft 26. In effect the drive is the same as if the epicyclic gear train or differential were not employed. If, however, the differential were not present and the shafts 26 and 52 were connected by a coupling, the rotational adjustment of the counter casing C relative to the meter frame F would affect the relationship between the casing C and the shaft 52 and thereby the registration of the counter wheels in the dial opening 38. The present invention prevents a faulty registration of this type. When the casing is angularly adjusted, the gear 74 walks about the rack 76 and the smaller idler 70 rotates the spider or carrier 66 in the same direction one-half the angular distance the casing travels relative to the frame F. If the meter shaft 26 is stationary, the spider walks the gears 62 about the gear 60 secured to the shaft 26 and the gears 62 rotate the shaft 52 by means of the upper gear 60 secured thereto in unison with the casing and no advancement or retraction of the counter wheels is effected. If the adjustment is made while the meter shaft is rotating, the differential still compensates for the movement of the casing in the same way and the counter wheels are only advanced accordingly as the meter shaft is advanced by the meter. The numeral wheels and the driven shaft 52 therefor are automatically adjusted relative to the casing C for each adjustment of the casing relative to the frame F and no manual adjustment is necessary.

Furthermore, it is not necessary to lock the casing in order to prevent it from moving from an adjusted position during a delivery operation. With the structure described, any rotation of the casing by the meter shaft 26 has to be transmitted to the driven shaft 52 and the inertia of the casing C and the friction load of the gears 68 and 76 and the idler gears 70 and 74 only introduce additional work for the meter shaft. Consequently the drive between the shaft 26 and the shaft 52 follows the path of least resistance which is through the gears 60 and the intermediate gears 62 and the latter drive does not alter the position of the casing C relative to the frame.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A counter having a fixed frame and a casing swivelly mounted on the frame, a meter shaft concentric with the swivel axis of the casing, means operably mounted in the casing and registering with the casing for visually indicating the number of revolutions made by the meter shaft relative to the frame, a driven shaft aligned with the meter shaft and rotatably supported in the casing for progressively advancing the indicating means, like bevel gears on the adjacent ends of the meter shaft and the driven shaft, a second pair of bevel gears supported by a spider and meshing with the first pair of beveled gears, and means for rotating the spider in the same direction and at half the speed of the casing when the casing is swivelly rotated.

2. In combination, a fixed support, a casing swivelly mounted relative thereto, indicating means mounted within the casing and comprising a rotatable indicating member, a driven shaft journaled in said casing and operatively connected to said indicating member, a drive shaft rotatable relative to said support, a constantly maintained positive driving connection between said drive shaft and driven shaft, and means interconnecting said support, casing and driving connection for causing said driven shaft to rotate relative to said drive shaft in direct proportion to the swivel movement between said casing and support when said casing is angularly adjusted relative to the support so that registration of said indicating means is not affected by swivel movement of said casing.

3. In combination, a fixed support, a casing swivelly mounted relative thereto, indicating means mounted within the casing and comprising a rotatable indicating member, a driven shaft journaled in said casing and operatively connected to said indicating member, a drive shaft rotatable relative to said support, a constantly maintained positive driving connection between said drive shaft and driven shaft and comprising a differential gearing, and means associated with said differential gearing for causing said driven shaft to rotate in unison with said casing without affecting said drive shaft when said casing is swivelly adjusted so that registration of said indicating means is not affected by swivel movement of the casing.

4. In combination, a fixed support, a casing swivelly mounted relative thereto, indicating means mounted within the casing and comprising a rotatable indicating member, a driven shaft journaled in the casing and operatively connected to said indicating member, a drive shaft rotatable relative to said support, a constantly maintained positive driving connection between said shafts including an epicyclic gear train, and an operative connection between said gear train, casing, and support for causing said driven shaft to be rotated with said casing without affecting the drive shaft when said casing is swivelled with respect to said support.

5. In combination, a support, a casing swivelly mounted thereon, indicating means carried by said support and comprising a rotatable indicating member, a driven shaft journaled in said casing and operatively connected to said indicating member, a drive shaft rotatable with respect to said support, a constantly maintained positive driving connection between said shafts and including a differential gearing having a carrier and planet gears carried thereby, and means between said support and carrier and carried by said casing, all for causing said driven shaft to rotate with said casing without affecting said drive shaft when said casing is swivelled with respect to said support.

6. In combination, a support, a casing swivelly mounted thereon, indicating means carried by said support and comprising a rotatable indicating member, a driven shaft journaled in said casing and operatively connected to said indicating member, a drive shaft rotatable with respect to said support, a differential gearing between said shafts and including sun gears secured to the respective shafts, planet gears meshing with said sun gears, and a carrier carrying said planet gears; a circular rack on said support, a circular rack on said carrier, a gear rotatably carried by said casing and meshing with said first rack, and a gear integral with said last mentioned gear and meshing with said second mentioned rack, said racks and gears meshing therewith being of such ratio that when said casing is swivelled with respect to said support said driven shaft is rotated in unison with said casing without affecting said drive shaft and when said casing is stationary and said drive shaft is driven, said casing is automatically maintained against being swivelled by the rotation of the drive shaft.

WILLIAM L. TANCRED.